United States Patent Office 3,541,444
Patented Nov. 17, 1970

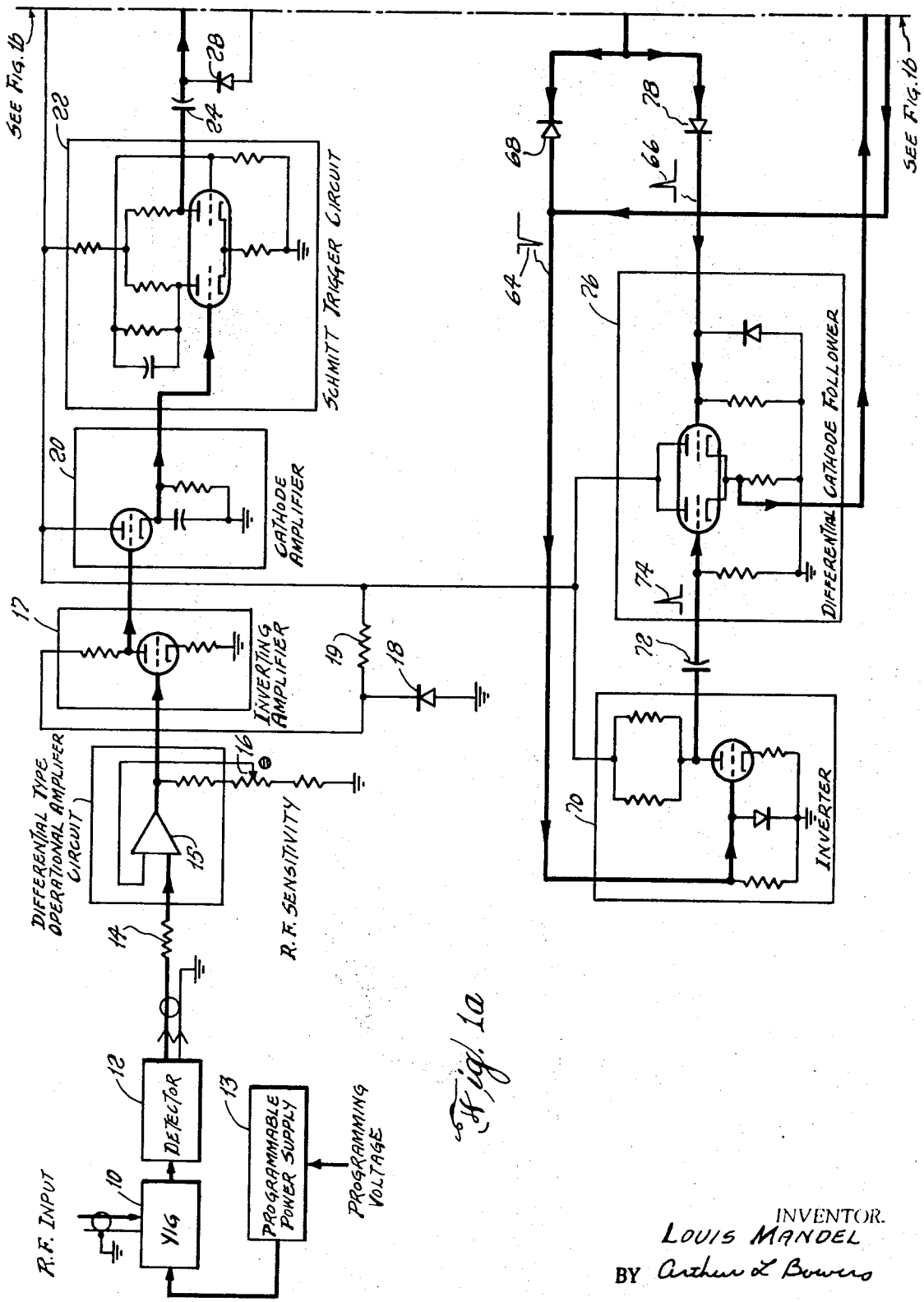

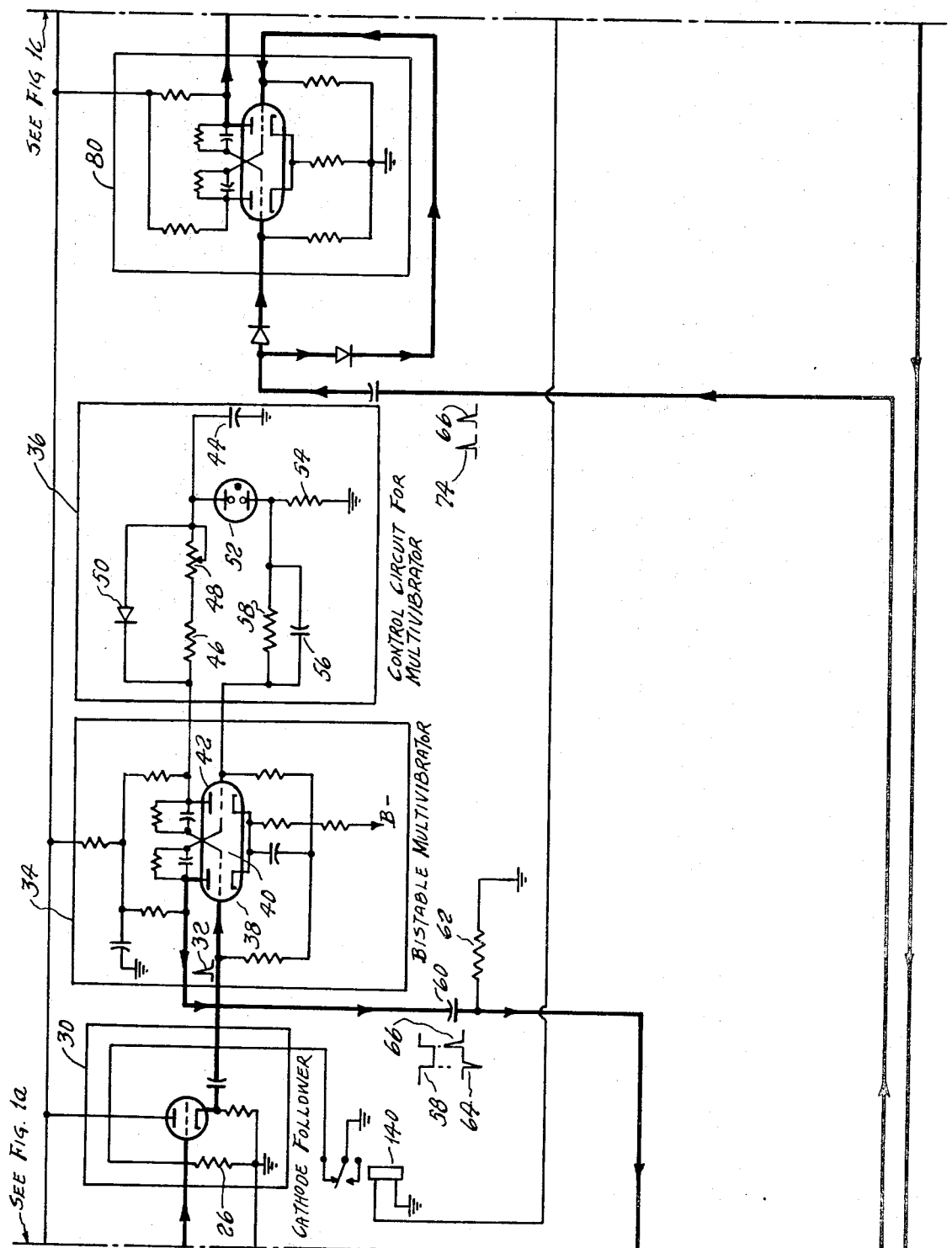

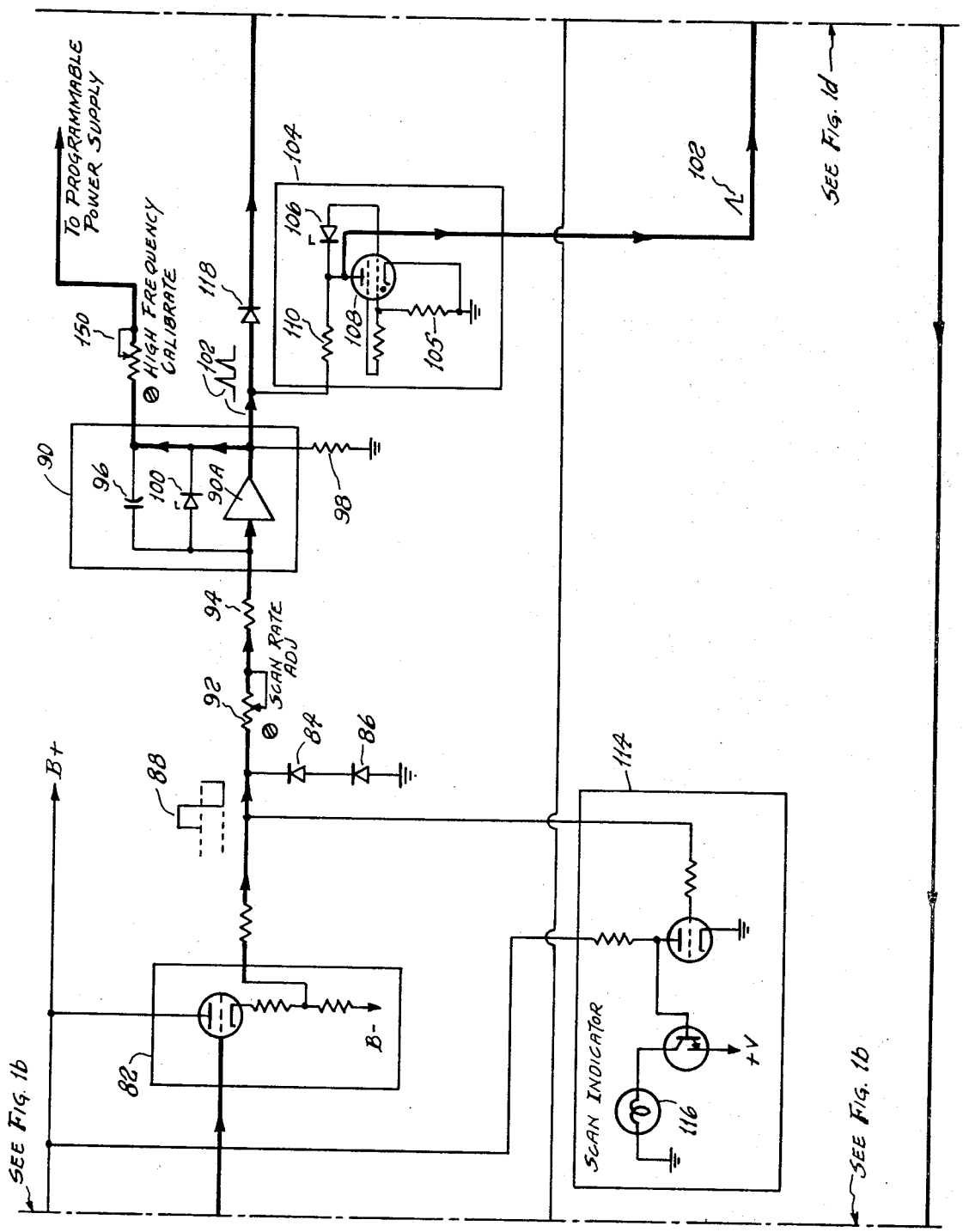

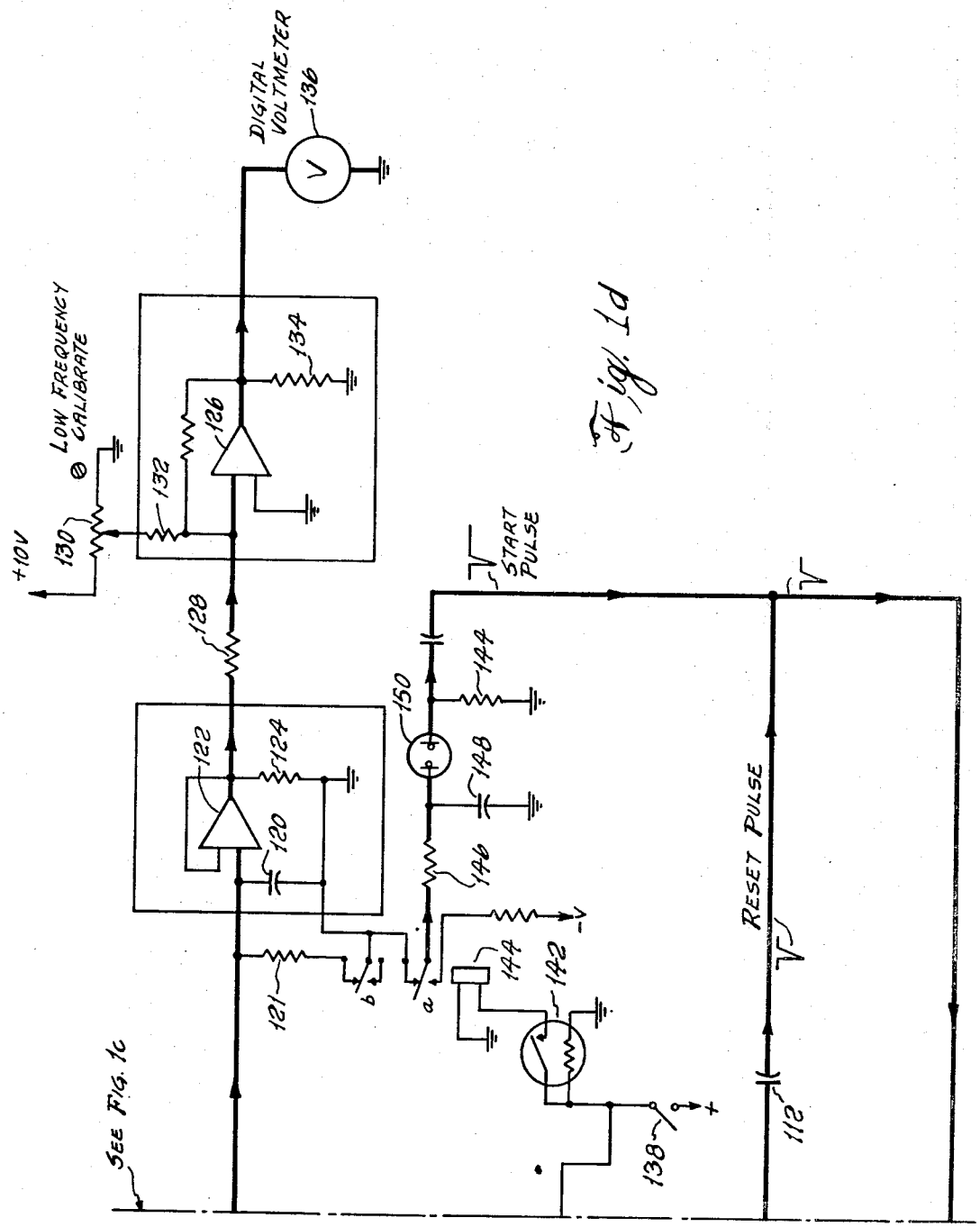

3,541,444
AUTOMATIC MICROWAVE FREQUENCY MEASUREMENT SYSTEM
Louis Mandel, Levittown, N.Y., assignor to the United States of America as represented by the Secretary of the Navy
Filed Aug. 6, 1968, Ser. No. 750,604
Int. Cl. G01r 23/02, 33/08
U.S. Cl. 324—78                    3 Claims

ABSTRACT OF THE DISCLOSURE

An energized RF source delivers its RF output to a YIG filter. Ramp current pulses coupled into the YIG cause the YIG narrow passband to scan its broad frequency band, e.g., from below 1 gHz. to above 13 gHz. commencing at one end of that band. A frequency registering circuit tracks the band scanning by the YIG. If RF energy passes through the very narrow passband of the YIG during the scanning and exceeds a threshold power level, the scan is terminated automatically, the frequency at which the scan is terminated is registered automatically and the scan is restarted. The scanning is repetitive, restarting after a predetermined interval. The YIG turning current is recurrently swept over the operating range of the filter. During each scan, when the level of tuning current is such that the YIG resonates at the operating frequency of the applied RF power, the RF passes through the YIG, is detected, and the detected signal terminates the scan. The tuning current to the YIG between scans is at that level for tuning the YIG to the RF signal frequency. A voltage proportional to this tuning current is applied to a voltmeter indicator which is calibrated to indicate the operating frequency in gHz.

---

The invention described herein may be manufactured and used by or for the Government of the United States of America for governmental purposes without the payment of any royalties thereon or therefor.

This invention relates to an automatic microwave frequency measuring system for use in testing klystrons through measuring the frequency or frequencies of significant power components of the RF energy output of the klystron where the frequency of the energy is on the order of $10^{10}$ cycles per second. This invention can be utilized in combination with a circuit disclosed in U.S. Pat. No. 3,226,654 which adjusts and then locks a klystron at that frequency at which RF power output is maximum. This circuit is then activated to scan a broad frequency band to identify the frequency of the peak power.

An object of this invention is to provide means for automatically scanning a broad frequency band for ascertaining the frequency of unknown RF energy, efficiently, rapidly, accurately and in a generally advantageous manner.

Other objects and advantages will appear from the following description of an example of the invention, and the novel features will be particularly pointed out in the appended claims.

The invention employs a commercially available type of tunable narrow band RF filter unit commonly known as a YIG. YIG is an acronym for yttrium-iron garnet, a ferrite material, which exhibits high-Q to incident RF. The resonant frequency is a function of DC magnetic field applied to the garnet. The resonant frequency and the magnetic field strength bear a linear relationship within the useful frequency range of the YIG.

A YIG structure includes a rectangular solid metal bar which has a surface channel formed in it for serving as a waveguide. Transverse bores intersecting the surface channel are formed in the bar. Highly polished garnet spheres about 0.050 inch in diameter are supported in the waveguide by elements extending through the transverse bores. A tuning coil surrounds the bar. The YIG absorbs incident RF energy outside its passband. Since the resonant frequency of the YIG is a linear function of magnetic field strength, the resonant frequency varies linearly with current in the coil. By changing the current in the coil from a predetermined reference level by adding a ramp current pulse, the sharply resonant passband of the YIG is caused to scan the frequency band of the YIG from one end toward the other. The narrow passband of the YIG is characterized by essentially constant bandwidth over the tunable range of the YIG, a characteristic not possessed by other tunable filters previously available. YIG units are available for various frequency bands between $10^9$ and $10^{11}$ cycles per second. Commercial units are available that have two or more YIG filter stages operated in series and tuned by the same magnetic field to achieve greater selectively and offband isolation.

In the drawings:
FIGS. 1a–1d are adjoining consecutive parts of a circuit diagram of an embodiment of this invention.

A klystron tube under test, not shown, is coupled to a YIG filter 10 for delivering its RF energy output to the YIG filter. When the YIG filter is tuned to the operating frequency of the tube under test, RF power passes through YIG filter 10 and is delivered to a broad-band crystal detector 12. A commercially marketed off-the-shelf low voltage DC programmable power supply 13 which provide an output current directly proportional to an input or programming voltage is coupled to and tunes the YIG. The programming voltage for power supply 13 is derived as described hereinafter.

The detector 12 is selected to have an RC time constant comparable in order of magnitude to the center of the range of the period of the RF from the YIG and converts the RF from the YIG 10 to a negative DC voltage of a magnitude which is related to the power level of the RF in the passband, assuming negligible loss in the detector 12. The output of detector 12 is coupled through a high resistance 14 into a noninverting differential-type commercially marketed operational amplifier 15 having a gain control potentiometer 16. It is characteristic of the YIG to generate spurious signals 25 db below the level of the input RF. To eliminate the spurious signals, the sensitivity of the system is appropriately limited by adjustment of potentiometer 16. The differential-type operational amplifier operates at or near unity gain and with a high degree of stability and linearity through use of a proper amount of negative feedback.

A DC amplifier 17 having a linear gain characteristic is coupled to the output of operational amplifier 15 and inverts the negative output of the operational amplifier. Plate supply voltage for amplifier 17 is closely controlled by Zener diode 18 and resistor 19. A cathode follower 20 couples the positive voltage output of the inverting amplifier 17 to Schmitt trigger circuit 22. The parameters of the DC amplifier are selected to operate with a quiescent plate voltage a number of volts below the trigger-on voltage of the Schmitt trigger circuit; after being triggered on, the Schmitt trigger circuit continues in the activated state until the power level of the RF passband and the corresponding DC voltage output from the cathode follower 17 falls back to a level at which the Schmitt circuit reverts to off, which voltage is lower than the Schmitt trigger-on voltage. The threshold RF power level required in the passband for triggering-on the Schmitt trigger circuit is preset by RF sensitivity gain control 16.

The positive pulse output of the activated Schmitt trigger circuit 22 is differentiated by capacitor 24 and resistor 26. A diode 28 shunted across resistor 26 permits leading edge positive pulses only to be delivered to cathode follower 30. Corresponding positive pulses 32 from cathode follower 30 are delivered to bistable multivibrator 34. In the drawings, the circuit is not activated. The grid of cathode follower 30 is grounded and no signals are delivered to the multivibrator 34.

Control circuit 36 operates to reset bistable multivibrator 34 a preset time interval after the multivibrator is triggered. When a positive trigger pulse 32 is delivered by the cathode follower 30 to the grid of triode section 38, the latter is switched from cutoff to saturation and triode section 42 is concomitantly switched from saturation to cutoff. In control circuit 36, the capacitor 44 connected by resistor 46, potentiometer 48, and diode 50 to the plate of triode section 42 begins to charge when the voltage on the plate of triode section 42 is increased. A gas discharge device 52, e.g., a neon glow lamp, in series with a surge limiting resistor 54 shunts the capacitor 44. When the voltage across capacitor 44 reaches the breakdown potential of the neon lamp 52, a positive pulse is developed across resistor 54. This pulse is coupled by parallel connected capacitor 56 and resistor 58 to the grid of triode section 42, reswitching the bistable multivibrator 34; that is triode section 38 is cut off and triode section 42 operates at saturation. The double switching cycle of dual triode 40 simulates the operation of a monostable mulivibrator. The duration of the negative output pulse 58 developed at the plate of the triode section 38 is dependent upon the selected time constant of capacitor 44, resistor 46 and potentiometer 48 and determines the time between the termination of one scan and the start of the next scan by the YIG.

The negative output pulse 58 is differentiated by the RC network consisting of capacitor 60 and resistor 62 to provide leading and trailing edge pulses 64 and 66.

The leading edge pulse 64 is coupled by diode 68 to the input of inverting amplifier 70. Capacitor 72 couples inverted pulse 74 to one side of differential cathode follower 76. The trailing positive pulse 66 is transmitted by diode 78 to the other side of double triode differential cathode follower 76. The pair of pulses 74 and 66 from cathode follower 76 are delivered successively to the two inputs of multivibrator 80. When the equipment is first turned on, the left side of the multivibrator is operated at near cut off and the right side at saturation. The leading pulse 74 inverts the multivibrator 80 so that the voltage on the grid of the cathode follower 82 is switched from near zero to a substantial positive voltage. The trailing pulse 66 reinverts the multivibrator 82 returning the voltage on the grid of the cathode follower to near zero. Series-connected diodes 84 and 86 maintain the negative output of cathode follower 82 at a voltage value which corresponds to the forward conducting voltage drop of silicon diodes 84 and 86. The positive pulse 88 which is delivered to operational amplifier integrator circuit 90 has a length that corresponds to the interval between pulses 74 and 66.

Adjustable resistor 92, fixed resistor 94 and capacitor 96 cause the amplifier to operate as a voltage integrator. The multivibrator 80 is designed such that when the right side is operating at saturation, a slightly negative voltage is applied to the input of the operational ampliger 90A which in response to constant amplitude, negative polarity DC voltage, e.g., minus 1 volt, produces a positive ramp voltage 102 across the output resistor. The slope of the ramp voltage 102 is adjusted by adjustable resistor 92. The ramp voltage is delivered to the programmable power supply 13 for the YIG. When the multivibrator is reinverted by pulse 66, the high positive plate voltage applied to the input of the operational amplifier 90 is intergrated, causing the voltage across the output resistor 98 to rapidly change in a negative direction. When this voltage reaches an amplitude which causes the diode 100 to conduct, the voltage across resistor 98 is maintained at this amplitude.

A thyratron circuit 104 is connected to the output of operational amplifier circuit 90. A Zener diode 106 is connected between the control grid and the anode of the thyratron 108. The thyratron conducts when the Zener diode conducts and a voltage is developed across resistor 105. The Zener diode 106 is selected to limit the peak of the positive ramp voltage 102. When the thyratron conducts, there is a rapid voltage decrease across resistor 110 and the resultant generated negative reset pulse is coupled through capacitor 112. Upon reset, the right side of multivibrator 80 delivers its high positive plate voltage to the operational amplifier circuit 90 causing the ramp voltage across resistor 98 to reset to approximately zero.

A scan indicator lamp 116 is connected to the output of cathode follower circuit 114. The lamp 116 is on only when the voltage at the output of cathode follower 82 is slightly negative for ramp voltage generation.

A diode 118 connected to the output of operational amplifier 90A delivers the ramp voltage pulses to an electrometer type voltage measuring arrangement that includes a capacitor 120 coupled between one input of operational amplifier and ground. Operational amplifier 122, selected for very high input impedance, e.g., $10^{11}$ ohms, is operated as a unity-gain voltage-following charge-hold isolation amplifier. Output voltage, developed across resistor 124, is coupled to the other or differential input of the amplifier 122 as inverse feedback. Voltage storage capacitor 120 charges to the peak of the ramp voltage. There is virtually no charge leakage through the high input impedance of the operational amplifier. The voltage that appears across the output load resistor 124 corresponds to the voltage to which the capacitor 120 is charged. In the drawings the equipment is off and the capacitor 120 is shunted by discharge resistor 121. During the reset portion of each cycle of the ramp voltage, when the equipment is on, the capacitor is prevented from discharging by an extremely low leakage diode 118.

Another differential operational amplifier 126 connected to operate as an inverting, unity-gain, summing amplifier is connected to the output of differential operational amplifier 122. The voltage applied to the input of operational amplifier 126 is the sum of the output voltage of operational amplifier 122 and the selectively adjustable calibration DC voltage from potentiometer 130 delivered by resistor 132. The voltage at the output of operational amplifier 126, developed across output load resistor 134, is the algebraic sum of the two voltages. To calibrate the digital voltmeter 136 at the low end of the frequency range, a low frequency end signal, e.g., 1 gHz. is applied to the circuit and potentiometer 130 is adjusted to produce a voltmeter indication of 1.00 volt which is read as 1 gHz. To calibrate the digital voltmeter at the high end of the frequency range, a high frequency end signal, e.g., 13 gHz. is applied to the circuit and potentiometer 150 is adjusted to produce a voltmeter indication of 13.0 which is read as 13 gHz.

After the kylstron under test is adjusted to the frequency at which RF power is maximum, the equipment is turned on by closing switch 138. Relay 140 is energized disconnecting from ground the grid of cathode follower 30. Thermal delay relay 142 is energized so that relay 144 is energized shortly after relay 140. The shunt resistor 121 is disconnected from across capacitor 120 and resistor 146 and capacitor 148 are connected across the negative voltage source. As soon as capacitor 148 charges to the breakdown voltage for neon lamp 150, a negative start pulse appears across resistor 144 to switch multivibrator 80.

When the equipment is first turned on the multivibrator can come to equilibrium in either state. For proper operation of the equipment prior to frequency measurement, the right side of the multivibrator should be in the non-conducting state to provide the high voltage input to the cathode follower 82. If the multivibrator 80 is in its other operational state and provides slightly negative voltage to cathode follower 82, the operational amplifier initiates generation of a positive ramp voltage resulting in a reset pulse generated by thyratron 180 to invert multivibrator 80.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:
1. An automatic microwave frequency measuring system comprising:
 a YIG filter, tunable by a ramp current pulse to scan across a very wide frequency band, for coupling to a source of RF of unknown frequency,
 a programmable power supply that supplies a ramp current pulse to the YIG in response to an input ramp voltage for tuning the YIG across the wide frequency band,
 a detector coupled to the YIG output,
 means for supplying ramp voltage starting from a predetermined voltage level to the programmable power supply,
 means coupled to the output of the detector for delivery to the means for supplying ramp voltage a ramp voltage termination pulse followed by a ramp voltage restart pulse a short time later in response to an output from the detector exceeding a predetermined threshold level,
 electrometer means for measuring the voltage at which the ramp voltage is terminated, and
 reset pulse generating means coupled to the means for supplying ramp voltag and responsive to a predetermined peak level of ramp voltage to terminate the generation of ramp voltage.

2. An automatic microwave frequency measuring system as defined in claim 1, further including.
 means operable for resetting the electrometer and for blocking generation of ramp voltage termination and start pulses and operable to generate a start pulse to commence generation of ramp voltage and to unblock generation of ramp voltage termination and start pulses.

3. An automatic microwave frequency measuring system as defined in claim 2:
 wherein said last recited means operable to unblock generation of ramp voltage termination and start pulses includes means for delaying resetting of the electrometer and for delaying generating a start pulse.

References Cited

UNITED STATES PATENTS 3,258,714  6/1966  Mandel _____ 331—84
3,374,436  3/1968  Thiess.

ALFRED E. SMITH, Primary Examiner

U.S. Cl. X.R.

324—.5